3,302,080
PRESSURE TRANSDUCER
Alan B. Dauger, Wallingford, Conn., and John M. Yarlott, Burlington, Vt., assignors to John M. Yarlott, Burlington, Vt.
Filed June 9, 1965, Ser. No. 462,654
7 Claims. (Cl. 317—246)

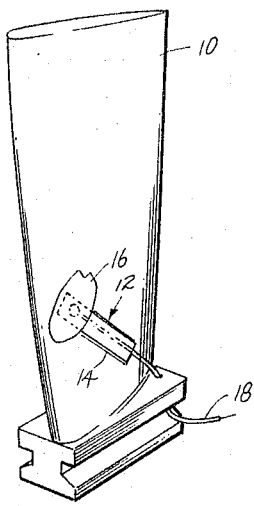
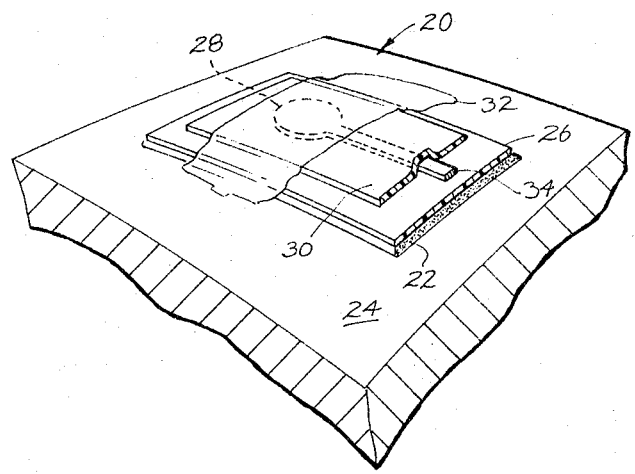
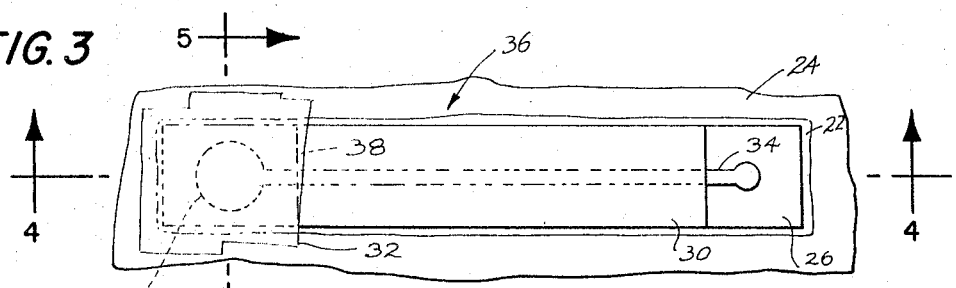
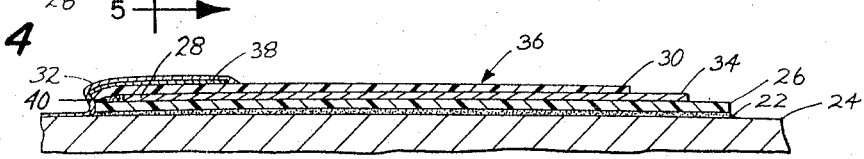
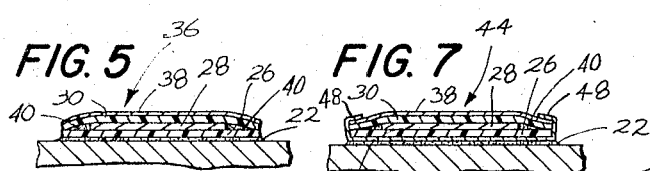
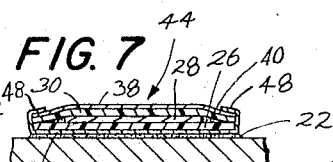
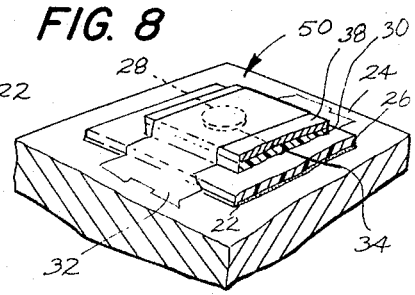
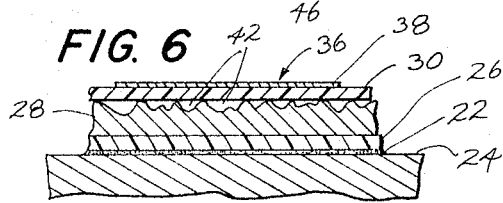
INVENTORS
ALAN B. DAUGER
JOHN M. YARLOTT

United States Patent Office 3,302,080
Patented Jan. 31, 1967

This invention relates to pressure transducers and deals more particularly with pressure transducers of the capacitive type for converting pressure fluctuations into corresponding fluctuations of an electrical capacitance.

The general object of this invention is to provide an improved pressure transducer particularly well adapted for sensing pressure fluctuations in a gaseous or liquid medium.

Another object of this invention is to provide a pressure transducer which is or may be relatively small in size and which may be attached directly to a supporting structure without producing a drastic change in shape of the structure. In keeping with this object, a more specific object of the invention is to provide a pressure transduced having a very thin profile or thickness so as to protrude only a slight distance from the surface to which it is attached, thereby producing little disturbance on the flow of air or other fluid over the surface.

Another object of this invention is to provide a pressure transducer of the foregoing character which is flexible so as to be capable of being cemented or otherwise fixed to a curved supporting surface.

A further object of this invention is to provide a pressure transducer which may be made at relatively low cost so as to be expendable.

Another object of this invention is to provide a pressure transducer for sensing relatively high frequency pressure fluctuations and capable of being made to sense the pressure over a relatively small zone or area so as to minimize directivity effects and the effects of averaging.

Still another object of this invention is to provide a pressure transducer having a small mass so that when applied to a rotating or otherwise moving part the centrifugal force or other acceleration force applied thereto is insufficient to pull the device from its support or to distort it and so that it does not unbalance the mechanism to which it is attached.

Other objects and advantages of the invention will be apparent from the following detailed description and from the drawing forming a part hereof.

The drawing shows preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Of the drawing:

FIG. 1 is a persepective view showing a pressure transducer embodying the present invention attached to the curved surface of a turbine blade.

FIG. 2 is an enlarged fragmentary persepective view showing in greater detail one form of pressure transducer embodying the present invention.

FIG. 3 is a plan view of a pressure transducer comprising another embodiment of this invention generally similar to that of FIG. 2.

FIG. 4 is a longitudinal vertical sectional view taken on the line 4—4 of FIG. 3.

FIG. 5 is a transverse vertical sectional view taken on the line 5—5 of FIG. 3.

FIG. 6 is an enlarged fragmentary vertical sectional view taken through the transducer of FIG. 3.

FIG. 7 is a transverse vertical sectional view taken through another form of transducer embodying the present invention.

FIG. 8 is a perspective view, generally similar to FIG. 2, but showing a slightly different form of the invention.

Turning now to the drawing and first considering FIG. 1, this figure shows an individual turbine blade 10 which may, for example, be considered to be part of a turbine undergoing test. For this purpose of measuring fluctuations in the pressure of the air or other fluid moving past the turbine blade 10, the blade has secured thereto a pressure transducer, indicated generally at 12, embodying the present invention. The transducer 12 may take various different shapes without departing from the invention, and in FIG. 1, and in the other figures of the drawing, is shown by way of example as having an elongated generally rectangular shape. The transducer is very thin and flexible, much like a similarly shaped strip of paper, so as to be capable of readily conforming to the curved outer surface of the turbine blade or other supporting surface to which it may be attached.

Generally, and as shown in FIG. 1, a transducer made in accordance with this invention is secured to the supporting surface by a quantity of suitable adhesive 14 applied between the bottom surface of the transducer and the supporting surface. Only a relatively small area of the transducer is sensitive to the surrounding pressure. As viewed in FIG. 1, the left-hand end of the transducer includes this small pressure sensitive area and this end of the transducer is electrically grounded to the turbine blade by a patch 16 of electrically conductive silver paint or similar material applied over the transducer and the part of the adjacent area of the supporting surface. Nevertheless, although FIG. 1 shows the patch 16 of paint applied only over the sensitive end of the transducer it may, if desired, be applied over the whole or greater extent of the transducer. Extending from the right-hand end of the transducer is a lead 18 for transmitting the signals produced by the transducer to an appropriate measuring device or system. As to the details of its construction, the transducer 12 of FIG. 1 may, for example, be similar to any of the transducers shown in the other figures of the drawing to which reference is now made.

Before considering the other figures of the drawing, however, it should be noted that the pressure transducers shown therein are made upof a number of layers of very thin sheet material or films and that for the purpose of clarity in the drawing, the thicknesses of the various layers or films have been greatly exaggerated in comparison to the other dimensions.

Turning now to FIG. 2, this figure shows in perspective the sensitive end portion of a pressure transducer 20, embodying the invention, which is bonded by an adhesive 22 to a curved supporting surface 24. As shown in this figure, the transducer 20 comprises a number of layers of thin sheet material superimposed on each other. These layers include a base strip 26 of dielectric material, a main electrode 28 on top of the base strip, and an upper strip 30 of dielectric material covering the main electrode. The main electrode 28 has a relatively small surface area in comparison to the dielectric strips 26 and 30 and both of the dielectric strips extend beyond the main electrode around its full periphery. A secondary electrode is provided for cooperation with the main electrode to produce the desired electrical capacitance, and this electrode, as hereinafter described in connection with FIGS. 3 to 8, may comprise an additional layer of electrically conductive material fixed to the upper surface of the upper dielectric strip prior to the attachment of the transducer to its supporting surface. In the transducer 20 of FIG. 2, however, no such additional layer is provided and the patch 32 of electrically conductive silver paint or the like is used to provide the secondary electrode as well as to ground the transducer to its support. That is, before the transducer 20 is applied to the supporting surface 24, it includes no secondary electrode. It should also be noted that the various layers of material making up the transducer 20, or other transducer of this invention, are or may be very thin and may, as for example in the case of a vacuum deposited metallic film forming one of the electrodes, have only a molecular thickness, and that the term "sheet material" as used herein is intended to include such extremely thin layers or films.

Still referring to FIG. 2, the bottom surface of the main electrode 28 is bonded or otherwise fixed relative to the upper surface of the base dielectric strip 26 so as to be incapable of moving relative thereto. An electrically conductive lead 34 is electrically connected to the main electrode 28 and extends along the length of the transducer, between the two dielectric strips 26 and 30, from the main electrode to the opposite end of the transducer. The main electrode 28 and lead 34 may take various different forms and, as shown in FIG. 2, may be integral with one another and comprise different parts of a common layer of metallic sheet material. This construction may in turn be obtained in various different ways as by cutting the electrode and lead from a piece of metallic foil and bonding it with an adhesive to the base dielectric strip 26, by properly masking the dielectric strip 26 and and vacuum depositing or electroplating the electrode and lead onto the strip, or by providing the strip with an all-over layer of metal and then etching away all of said layer except for the electrode and lead in accordance with conventional printed circuit techniques.

FIGS. 3, 4, 5 and 6 show a transducer 36, embodying the invention, which is identical with that of FIG. 2 except for including an additional thin layer or film of conductive material over the upper surface of the upper insulating strip to provide a secondary electrode either by itself or in conjunction with a patch of conductive paint applied thereover. Reference is therefore made to these figures for further details of the construction of both the transducer 20 and the transducer 36, and in these figures the parts of the transducer 36 which are similar to corresponding parts of the transducer 20 have been given the same reference numerals as such parts of the transducer 20 and need not be redescribed. Considering first FIGS. 3, 4 and 5, it will be noted that the transducer 36 is in every way similar to that shown at 20 in FIG. 2 except for including a thin layer 38 of metal covering the upper surface of the upper dielectric strip 30 in the area immediately above the main electrode 28. This layer 38 may, but need not, cover the full extent of the transducer and in the illustrated example is shown to be applied only to the sensitive end of the transducer. The bottom surface of the layer 38 is bonded or otherwise firmly fixed to the upper surface of the dielectric strip 30 so as to be incapable of moving relative thereto. In cases where the supporting structure is electrically conductive, the conductive layer 38 may be grounded to such supporting structure by a patch 32 of silver conductive paint or the like as shown in FIG. 4. Where the supporting structure is electrically nonconductive, a separate lead or similar conductor (not shown) may be connected with the layer 38 for completing the electrical circuit to the measuring device or system. In FIGS. 5 and 6, the transducer is shown with the patch 32 of conductive paint omitted for reasons of clarity. In the area surrounding the main electrode 28, and on either side of the lead 34, the two dielectric strips 26 and 30 are bonded to one another as by heat sealing or by the use of a suitable adhesive such as shown at 40, 40.

Referring now to the enlarged fragmentary view of FIG. 6, the operation of the transducer of this invention is dependent on variations in the electrical capacitance between the main electrode 28 and the secondary electrode which is fixed to the upper flexible dielectric strip 30 and which in FIG. 6 is constituted by the separate metallic layer 38. The variations in the electrical capacitance in turn arise as a result of the movement of the dielectric strip 30 into and out of extremely small surface cavities or recesses, such as shown at 42, 42 in the upper surface of the main electrode 28. That is, the upper surface of the main electrode 28 is relatively rough, rather than being highly polished or smooth, so as to include minute surface irregularities which may be of a microscopic nature. Normally, the usual surface finish of the electrode 28 is sufficiently rough to produce the desired effect, but if necessary the upper surface of the electrode may be lightly sanded, etched or otherwise treated to increase its surface roughness. The lower surface of the dielectric strip 30 freely engages the upper surface of the main electrode 28 in the manner shown in FIG. 3 so as to touch the high spots of the electrode surface. Air or other compressible fluid is trapped between the main electrode and the strip 30 in the surface recesses 42, 42. By the term "freely engages" it is meant here that the dielectric strip 30 merely rests against the adjacent surface of the main electrode 28 and is not in any way adhered or bonded to such surface, although it may in some instances be stretched over the electrode.

The thicknesses of the upper dielectric strip 30 and the associated secondary electrode are made of such small dimension that as a result of changes in the pressure of the fluid medium surrounding the transducer, the dielectric strip and the secondary electrode are moved into or out of the microscopic recesses 42 to change the spacing between the two electrodes and thereby to vary the electrical capacitance of the unit. The dielectric strip 30 is preferably made of a flexible plastic material having a thickness of 0.001 inch or less and may, for example, comprise a film or thin sheet of Mylar having a thickness of approximately 0.00025 inch or less. The metallic layer 38 in turn preferably has a thickness less than the thickness of the dielectric strip 30 and when the strip 30 is a 0.00025 inch thick Mylar film, may comprise an aluminum coating on such film having a thickness of approximately 0.00005 inch or less. Such a layer or coating of metal may be applied, for example, by a vacuum depositing process or by a plating process. In addition to the thinness of the layers 30 and 38 permitting them to move into and out of the surface roughness recesses of the main electrode it also provides the moving part of the transducer with a low mass. This combination of low mass with the high spring rate provided by the trapped air in the surface recesses 42, 42 results in the transducer having a very high natural frequency which may be on the order of one hundred kilocycles or greater.

In addition to the upper dielectric strip 30 and the upper metallic layer 38, if any, being relatively thin and flexible, the main electrode 28 and the base dielectric strip are also preferably made of thin flexible material so that the complete transducer is flexible and capable of conforming to various different curved surfaces to which it may be applied. To achieve this overall flexibility of the transducer, the main electrode 28 and the base dielectric strip 26 need not, however, be as thin as the upper dielectric strip 30 and the metallic layer 38, and each may, if desired, be made several thousandths of an inch thick. Preferably, however, the base dielectric strip is no more than 0.004 inch thick. As a more particular example, the base dielectric strip 26 may be made from a strip of Mylar of approximately 0.002 inch thickness and the electrode 28 and lead 34 may be made from a 0.001 inch thick sheet of aluminum foil.

It may also in some instances be desirable to provide the transducer of this invention with an extra metallic layer below the base dielectric strip 26 to shield the transducer from the effects of stray fields and to minimize the effect of any relative motion between the main electrode and any electrically grounded supporting structure. A transducer including such an extra shielding layer is shown at 44 in FIG. 7 and is similar to the transducer 36 of FIG. 5 except for including an additional metallic layer 46 the upper surface of which is bonded to the lower surface of the base dielectric strip 26. The shield layer 46 underlies the area of the main electrode 28 and may, if desired, extend the full length of the transducer. When the transducer includes an upper metallic layer, such as shown at 38 in FIG. 7, the shield layer 46 is preferably electrically connected to such upper metallic layer in a suitable manner. In the construction of FIG. 7, this electrical connection is obtained by providing the shield layer 46 with lateral edge portions 48, 48 which are folded upwardly and inwardly over and against the marginal edge portions of the upper metallic layer 38.

Also, in addition to the above construction wherein the main electrode 28 is comprised of a very thin layer of metal, the transducer of this invention may also be made, as shown in the tranducer 50 of FIG. 8, with the main electrode having a much greater thickness than any of the other layers of the transducer. For example, the main electrode 28 of the transducer 50, may be formed as a small circular button cut from metal stock having a thickness of five to ten thousandths of an inch or may be a composite structure comprising a thin metal foil, a vacuum deposited or plated metallic layer, or the like supported on a more or less rigid backing material. When such a relatively thicker main electrode is employed, the electrode may or may not have sufficient flexibility to conform exactly to the surface to which it is applied. But nevertheless, by maintaining the diameter or other maximum dimension of the electrode very small the departure of the electrode from the curvature of the supporting surface will be negligible. That is, by maintaining the maximum dimension of the electrode at about one-eighth of an inch or less, the maximum difference in spacing of any two points of the electrode from the supporting surface will be of about the same magnitude as the thicknesses of the various other layers of flexible material making up the transducer for most curved surfaces to which the transducer may be applied. Therefore, the fact that the electrode may not fully deform to the shape of the supporting surface will be virtually unnoticeable.

In cases where the main electrode 28 is relatively thick in comparison to the other layers of the transducer the lead 34 is preferably made of a much thinner material so as to be readily deformable to suit the contour of the supporting surface. In the transducer 50 of FIG. 8, for example, the lead 34 constitutes a thin wire electrically connected to the electrode.

The invention claimed is:

1. A capacitive type pressure transducer comprising a plurality of layers of thin sheet material, said layers including a base strip of dielectric material, a main electrode on top of said base strip, said main electrode having a bottom surface fixed relative to the top surface of said base strip and having a rough top surface, and an upper flexible strip of dielectric material having its bottom surface freely engaging at least a part of said rough top surface of said main electrode, said base strip of dielectric material being flexible so that said transducer apart from the area of said main electrode is capable of conforming to various different curved surfaces to which it may be attached, said main electrode being of such a small maximum dimension that if said electrode does not deform as said transducer is applied to a curved surface the maximum difference in the spacing of any two points thereof from said curved surface will be of the same magnitude as the thickness of said various layers, said base dielectric strip being made from a plastic having a thickness of no more than four thousandths of an inch, and said upper dielectric strip being made from a plastic having a thickness of no more than one thousandth of an inch.

2. A capacitive type pressure transducer as defined in claim 1 further characterized by said plurality of layers of thin sheet material including an upper metallic layer fixed relative to the upper surface of said upper dielectric strip and having a thickness less than the thickness of said base dielectric strip.

3. A capacitive type pressure transducer as defined in claim 2 further characterized by said upper dielectric strip having a thickness of approximately 0.00025 or less, and said upper metallic layer having a thickness of approximately 0.00005 inch or less.

4. A capacitive type pressure transducer comprising a thin base layer of dielectric material, a main electrode having a rough top surface and having its bottom surface bonded to said base layer of dielectric material, a thin upper layer of dielectric material having its bottom surface freely engaged with at least a part of said rough top surface of said main electrode, said two layers of dielectric material extending beyond said main electrode and being bonded to each other in the area surrounding said main electrode, said two layers of dielectric material being flexible so that said transducer apart from the area of said main electrode is capable of conforming to various different curved surfaces to which it may be attached, a layer of electrically conductive material on top of said upper layer of dielectric material and having its bottom surface fixed relative to the upper surface of said upper layer of dielectric material, and a lead electrically connected to said main electrode and passing between said two layers of dielectric material from said main electrode to a point remote therefrom.

5. A capacitive type pressure transducer as defined in claim 4 further characterized by a layer of electrically conductive material located below and adjacent to said base layer of dielectric material.

6. A capacitive type pressure transducer as defined in claim 4 further characterized by said main electrode having a maximum dimension of one-eighth inch or less.

7. A capacitive type pressure transducer comprising a plurality of layers of thin sheet material, said layers including a base strip of dielectric material, a main electrode on top of said base strip, said main electrode having a bottom surface fixed relative to the top surface of said base strip and having a rough top surface, and an upper flexible strip of dielectric material having its bottom surface freely engaging at least a part of said rough top surface of said main electrode, said base strip of dielectric material being flexible so that said transducer apart from the area of said main electrode is capable of conforming to various different curved surfaces to which it may be attached, said main electrode being of such a small maximum dimension that if said electrode does not deform as said transducer is applied to a curved surface the maximum difference in the spacing of any two points thereof from said curved surface will be of the same magnitude as the thickness of said various layers, and said upper dielectric strip being made from a plastic having a thickness of no more than one thousandth of an inch.

References Cited by the Examiner

UNITED STATES PATENTS 3,134,953   5/1964   Eisler _____ 73—88 X
3,139,619   6/1964   Jones _____ 317—261 X

OTHER REFERENCES

Kuhl W. et al.: Condenser Transmitters and Microphones With Solid Dielectric for Airborne Ultrasonics in Acustica, vol. 4, No. 5, 1954, pp. 519–532.

E. GOLDBERG, *Assistant Examiner.*

LEWIS H. MYERS, *Primary Examiner.*